United States Patent [19]

Asano et al.

[11] Patent Number: 4,623,938
[45] Date of Patent: Nov. 18, 1986

[54] ORIGINAL IMAGE PROCESSING APPARATUS WITH IMPROVED COVER

[75] Inventors: Junichi Asano, Hohya; Hiroyuki Ishii, Yokosuka; Otoya Kosugiyama, Yokohama, all of Japan

[73] Assignee: Canon Kabushiki Kaisha, Tokyo, Japan

[21] Appl. No.: 614,765

[22] Filed: May 29, 1984

[30] Foreign Application Priority Data

Jun. 7, 1983 [JP] Japan .................................. 58-100240
Jun. 7, 1983 [JP] Japan .................................. 58-100241

[51] Int. Cl.$^4$ ...................... H04N 1/04; H04N 1/40; H04N 1/10
[52] U.S. Cl. ................................ 358/285; 358/293; 358/282; 355/68; 355/75
[58] Field of Search ............... 358/282, 285, 287, 293, 358/294, 256; 355/75, 14 E, 76, 68

[56] References Cited

U.S. PATENT DOCUMENTS

| | | | |
|---|---|---|---|
| 3,914,049 | 10/1975 | Basu et al. | 355/68 |
| 4,231,069 | 10/1980 | Wellendorf et al. | 358/256 |
| 4,275,423 | 6/1981 | Takahashi et al. | 358/293 |
| 4,325,086 | 4/1982 | Sato et al. | 358/280 |
| 4,455,577 | 6/1984 | Tokuhara | 358/294 |
| 4,495,521 | 1/1985 | Nagoh | 358/256 |

Primary Examiner—James J. Groody
Assistant Examiner—John K. Peng
Attorney, Agent, or Firm—Fitzpatrick, Cella, Harper & Scinto

[57] ABSTRACT

An apparatus for forming an image of an original includes an illumination source for illuminating an original, a photosensor for receiving light from the original illuminated by the illumination source and a cover for covering the back of the original. The cover has the rate of specular reflection not less than 60% but not more than 90%. The photosensor is so located that it receives the light scatteredly reflected by the original but not the light specularly reflected by the cover.

14 Claims, 20 Drawing Figures

FIG. IIA

ORIGINAL IMAGE PROCESSING APPARATUS WITH IMPROVED COVER

BACKGROUND OF THE INVENTION

The present invention relates to an apparatus for processing an original image, such as a copying machine, or facsimile machine, original image memorizing machine.

It is desired in such types of machines that the position or size of an original placed on an original supporting surface be detected. For example, the detection of the original size may be used for automatically selecting the size of recording paper, or it may be compared with the size of recording paper to automatically determine the magnification of the copy. In another type wherein an image of the original is detected by an image pick-up element and converted to the electric signals, which is then reproduced on the photosensitive member surface or the recording material, it is desired that only the information for the area where the original exists is stored, or that the image signal is written in the area corresponding to the size of the original.

As for a simplest and most practical method of detecting the size or position of the original, there is an optical method wherein the original is illuminated, and the light reflected by the original is received by a photosensor, which produces outputs in accordance with the intensity of the received light, so that the outputs are used for determining the position and/or the size of the original.

It is practical to illuminate the original in order to detect or determine the position or the size of the original or to project an image of the original onto the photosensitive member or the image pick-up element. And, it is also practical to provide a original cover for covering the back side of the original to press-contact the original onto the original supporting surface and to prevent the light from going out. Generally, the cover has a white surface adapted to oppose to the back of the original. Then, there is a problem in detecting the position and/or the size of the original, since an original usually has a white background, so that the light reflected by the background of the original and the light reflected by the cover are detected by the photosensor at substantially the same level.

To avoid this problem, it is proposed that the cover be made black or that the cover be opened to uncover the original when the position or the size of the original is detected. By doing so, the light directed to the outside of the original is not incident on the photosensor, so that the light amount is clearly different between the original area and the outside thereof. The clear difference makes possible the detection of the position and/or size.

However, this method has a corresponding problem. Generally speaking, the light incident on the original from the light source is partly reflected by the original surface and partly transmitted therethrough. The ratio of the reflected light and the transmitted light is different depending on the material or the thickness of the original. If there is an additional member at the back of the original as in the case of a book original or in the case of white original cover, the light transmitted through the original is reflected by the additional member and transmitted back through the original to reach the photosensitive member or the image pick-up element and contributes to exposing them to image light. Therefore, in ordinary image processing and image forming machines, the light transmitted through the original and then reflected by the back member is taken into consideration when determining the level of white of the original cover. When, however, the original cover is black, or when it is opened, the light transmitted through the original to the back thereof is absorbed by the black cover or is scattered into the air so that such light is not effective to expose the photosensitive member and the image pick-up element. This decreases the light level for white. High grade paper ordinarily used in offices allows a quite large amount of the light to transmit therethrough. So, the resultant images have foggy background. In the case of tracing paper, a greater amount of light is transmitted and is not returned, so that the background is further black even to such an extent that the image part and the background part are not district from each other. This is not practical.

Therefore, it has been proposed that the covering surface be so colored that the photosensitive member and the image pick-up element are highly sensitive, that is, so that they deem it as white and that an additional sensor which is not sensitive to such a color be used for discriminating the size and position of the originals. The latter sensor is relatively insensitive to the color of the cover, so that the difference between the cover and the original is clear. However, the background of originals is not necessarily white in color. In the case of a non-white background, it becomes difficult to distinguish the original and the cover. Also, it is not possible for such a sensor to double as an image pick-up element.

As a solution to those problems, U.S. Ser. No. 537,679 (corresponding to U.K. Patent Application No. 8327255 and German Patent Application No. 3336961.5) proposes that the covering surface be made of a mirror surface. Since, however, the original cover is handled by operators, the mirror surface can be stained by, for example, a finger print or thumb mark. The mirror surface, having a high rate of specular reflection, e.g., 90–100%, if stained with finger prints or the like, may scatter the light so that the stained portion is erroneously taken as a white portion. Also, the appearance of the surface is bad when it is stained, because it is a mirror surface.

SUMMARY OF THE INVENTION

Accordingly, it is a principal object of the present invention to provide an improved apparatus for image processing.

It is another object of the present invention to provide an image processing apparatus, wherein the position and/or the size of an original is detected, without decreasing the light amount level for white.

It is a further object of the present invention to provide an image processing apparatus, wherein the position and/or size of an original is positively detected even if the original has non-white background.

It is a further object of the present invention to provide an image processing apparatus, wherein a position and/or size of an original is positively detected even if the original has a high transparency.

It is a further object of the present invention to provide an image processing apparatus, wherein a stain of an original covering surface does not deteriorate the appearance thereof and is not erroneously taken as a part of the original.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENT

Figure 1:
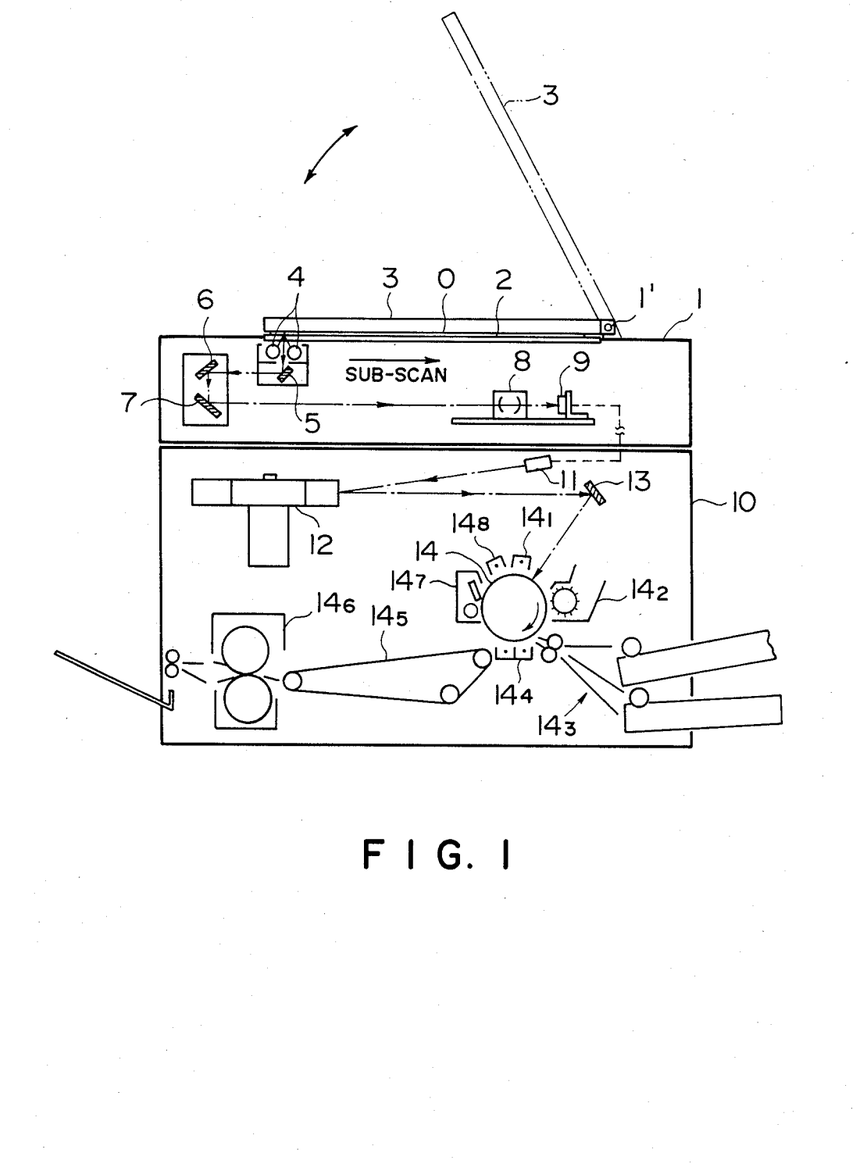
FIG. 1 is a cross-sectional view of an apparatus according to an embodiment of the present invention.

Referring now to FIG. 1, there is shown an image processing apparatus according to an embodiment of the present invention.

The apparatus comprises an original reading station 1 including an original supporting glass plate 2 for supporting an original O and comprises an original cover 3 which is rotatably supported on a shaft 1' fixedly secured at the reading station 1. The original cover 3 is adapted to be press-contacted to the back side or face of the original O. It is movable between a closed position, shown by solid lines, wherein it urges the original O to the glass plate 2, and an open position, shown by phantom lines, wherein it is away from the original O. The original cover O is moved by an operator between the two positions. When the original cover 3 is at its open position, the operator can put the original O or take it out.

When the original O is placed on the glass plate 2 and pressed by the original cover 3, it is illuminated by the lamp 4. The light incident on the original O is partly reflected by the original O. The remainder is transmitted through the original O and is reflected by the original cover 3 and then transmitted back through the original, whereafter it is scatteredly emergent from the original O. Both of those components of the light are reflected sequentially by the mirrors 5, 6 and 7 and finally incident on a solid state image sensor 9 through an imaging lens 8. Thus, a light image of the original O illuminated by the lamp 4 is formed on the image sensor 9. The image sensor 9 includes a number of small photoelectric converter elements each producing electric signals in response to the amount of light it receives. The elements are arranged along a main scanning line (perpendicular to the drawing of FIG. 1). The image formed on the sensor 9 is electrically scanned, and the sensor 9 produces time-series electric signal corresponding to the image.

As for the sub-scan, that is, the scan in the direction perpendicular to the main scan, the lamp 4 and the mirror 5 move together in the direction shown by the arrow. The mirrors 6 and 7 move in the same direction but at half speed.

The apparatus further includes an image recording station 10. It comprises a semiconductor laser source 11 driven in response to the image signals produced at the reading station 1. It further comprises a polygonal mirror 12 for scanningly deflecting the laser beam produced by the laser source 11 and a mirror 13 for reflecting the beam deflected by the polygonal mirror 12 and directing the same to an electrophotographic photosensitive member 14, which is rotatable in the direction of arrow. The photosensitive member 14 is scanned by, and therefore exposed to the laser beam. On the photosensitive member 14, an electrostatic latent image is formed by a known process in accordance with the exposure to the laser beam. The formed image is developed into a visualized image, which is then transferred onto recording material, such as paper, and fixed thereon. Around the photosensitive drum 14, there are provided a charger $14_1$, a developing device $14_2$, a paper feeding mechanism $14_3$, an image transfer corona discharger $14_4$, a paper conveying mechanism $14_5$, an image fixing device $14_6$, a cleaning device $14_7$ and a discharger $14_8$, which are operated to perform the known electrophotographic process.

Before reading the information on the original O, the lamp 4 and mirrors 5, 6 and 7 are moved in the sub-scanning direction to preliminarily scan the original O. During this pre-scan, the position and/or the size of the original is detected. After the pre-scan, the lamp 4 and mirrors 5, 6 and 7 are again moved in the same direction to read the image information of the original O. The information of the original position obtained in the pre-scan is processed to determine the area which should be read and/or to determine the position of image reproduction, while the information of the original size is processed to determine the selection of the paper size and/or the selection of reproduction magnification.

The surface of the cover 3 which is opposed to the original supporting glass 2 is a reflecting surface having a rate of specular reflection of 60-90%, which means that 60-90% of the amount of the incident light is specularly or regularly reflected. Specular reflection is defined as the reflection wherein the incident angle is equal to the reflection angle. The component of the light which is specularly reflected is called "specularly reflected light" in this specification.

Figure 2:
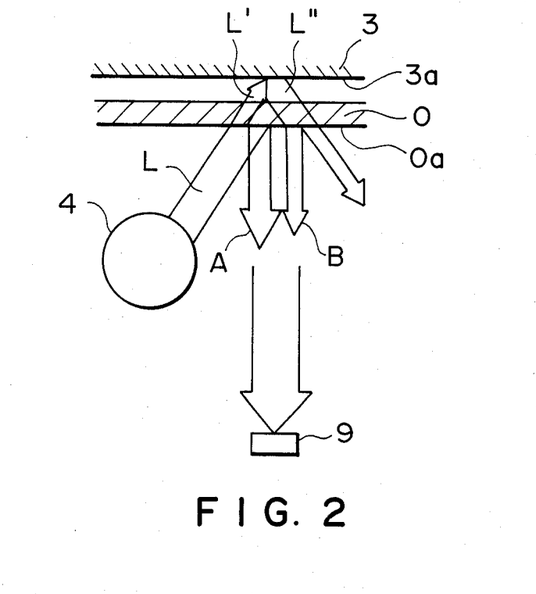
FIGS. 2 and 3 are schematic illustrations of the light reflected by the original and original cover.

FIG. 2 illustrates the behavior of the light when the original O placed on the supporting glass 2 and pressed by the cover 3, is illuminated by the lamp 4. The cover 3 actually contacts the original O, but it is shown as being slightly spaced apart for the better understanding of the explanation. The light L emitted from the light source, i.e., lamp 4, is partly scattered by the image bearing surface Oa of the original O as light A. The remainder is transmitted through the original O as light L'. Since a covering surface 3a of the original cover 3 is such a reflecting surface as defined hereinbefore, it reflects the transmitted light L' as light L". The reflected light L" is transmitted back through the original O and scatteredly emitted from the original O. A part B of the emitted light is parallel to the light A. The light A and light B are finally received by the solid-state image pick-up element 9 by way of the mirrors 5, 6 and 7 and the lens 8. Even if the original O is semi-transparent, such as tracing paper, a sufficient amount of light can reach the image pick-up sensor 9 since the light A and light B are added, so that the sensor 9 detects the reached light at a level equivalent to the white level. Therefore, the background of the reproduced image is not foggy.

Figure 3:
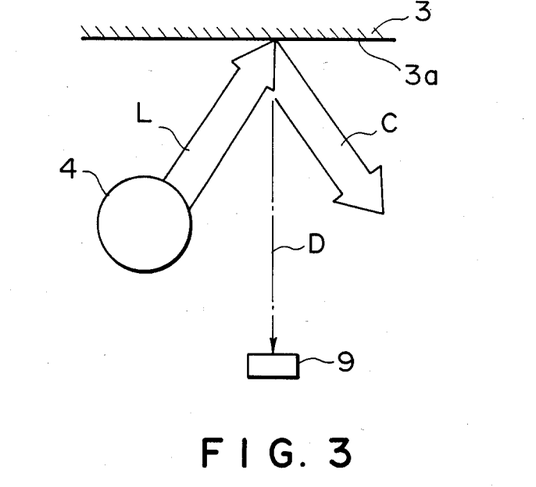

FIG. 3 shows the behavior of the light when there is no original on the supporting glass 2, that is, under the original cover 3 which is at the closed position. The illuminating light is reflected directly by the cover 3 as shown by reference character C, and the amount of specularly reflected light is 60-90% so that the amount of the scattered light D reaching to the image sensor 9 by way of the mirrors 5, 6 and 7 and the lens 8 is very small. Of course, the light specularly reflected by the original cover 3 does not reach the image sensor 9. Therefore, the sensor detects the surface 3a above at a level equivalent to black.

Figure 4:
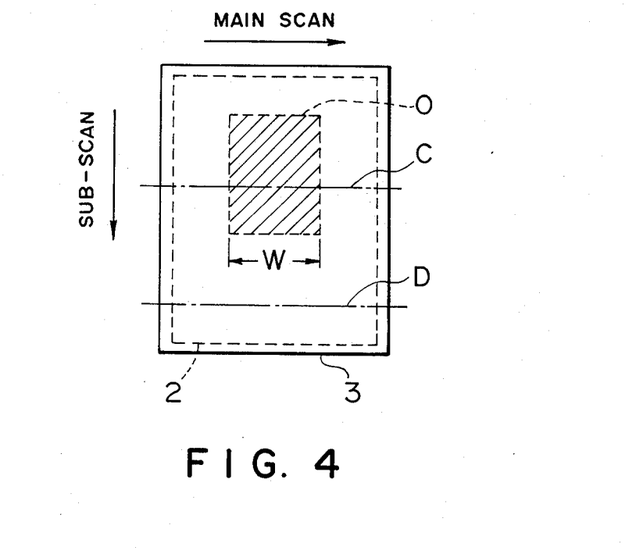
FIG. 4 is an schematic illustration of the original placed on an original supporting glass.

FIG. 4 shows an example of a way of original placement, wherein a original O having an width W is placed on the original supporting glass plate and covered by the original cover at its upper side.

Figure 5A:
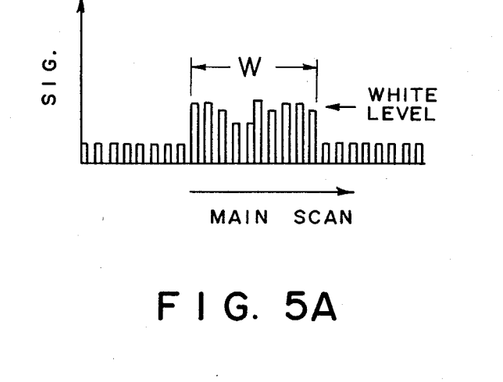
FIGS. 5A and 5B are an illustration of outputs of a photosensor.
Figure 5B:
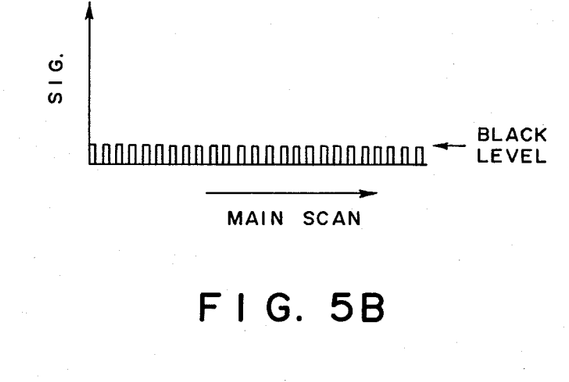

FIG. 5 shows the signals produced by the solid-state image sensor 9 when the original is placed as shown in FIG. 4. The scan in the main scanning direction C produces the signals shown in FIG. 5A, which represents the original existing range (width W) as the white level except for the dark parts constituting the image, while representing the outside range as the black level. The main scan along another main scanning line D (no original) produces the signals shown in FIG. 5B all of which are at the black level.

Thus, the area where the original is present can be clearly distinguished from the area where there is no original. The point at which the signal changes from the black level to the white level is detected as an edge of the original by a signal processing circuit which will be described hereinafter. By doing so, the position of the original O can be detected.

The specular reflection rate of the cover surface in the present invention will be explained in detail. As has been explained hereinbefore, the cover surface 3a has the specular reflection rate of 60-90%. It is assumed for the purpose of explanation that the cover surface 3a has the specular reflection rate higher than 90%. In this case, if the surface 3a is made dirty by, for example, a finger print or the like, the dirty portion scatteredly reflects the light in the fashion as would an original so that the image sensor 9 detects it at a white level to determine it is an original. Also, the dirty portion is conspicuous since the surface is highly specular. These drawbacks are almost eliminated by making the surface semi-specular (60-90% of the specular reflection rate) for the following reasons.

Figure 6:
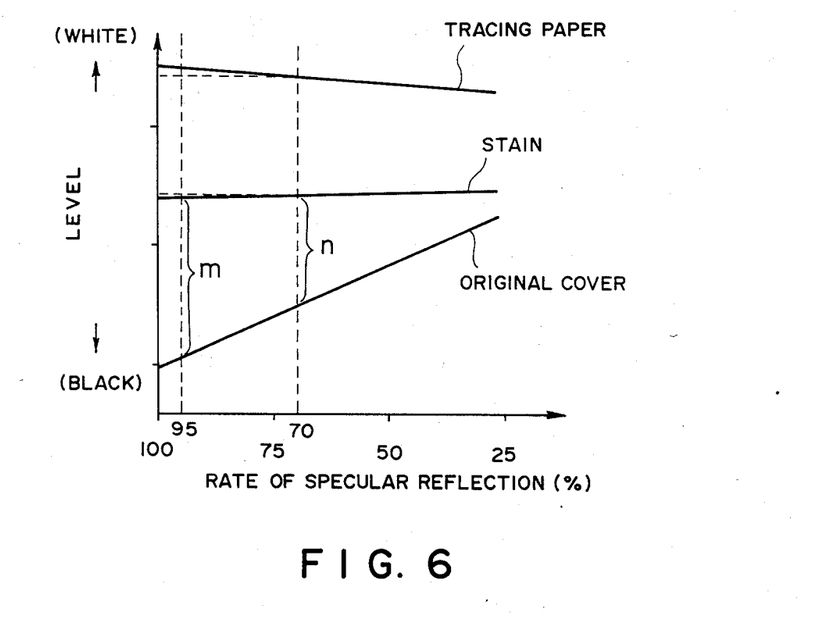
FIG. 6 is a graph showing the relation between the rate of specular reflection and the light level.

FIG. 6 is a graph showing the relation between the specular reflection rate of the cover surface 3a and the level of the light. The relations are shown for a tracing paper as an original, for the cover surface 3a with stain and for the cover surface 3a without stain. Take the specular reflection rate of 95% and that of 70% for comparison. The difference in the light level between the stained surface and the not stained surface is m for specular reflection rate of 95% and n for specular reflection rate of 70% (m>n). It is understood that the stain is less succinct when the specular reflection rate is 70%. For a semi-transparent original, such as tracing paper, the light level decreases with the specular reflection rate. However, as shown in FIG. 6, the decrease is very small so that the decrease of signal-to-noise ratio is negligible. It has been found that the specular reflection rate of 60-90% shows good results both from the standpoint of good signal-to-noise ratio and from that of conspicuousness of stain.

Figure 7:
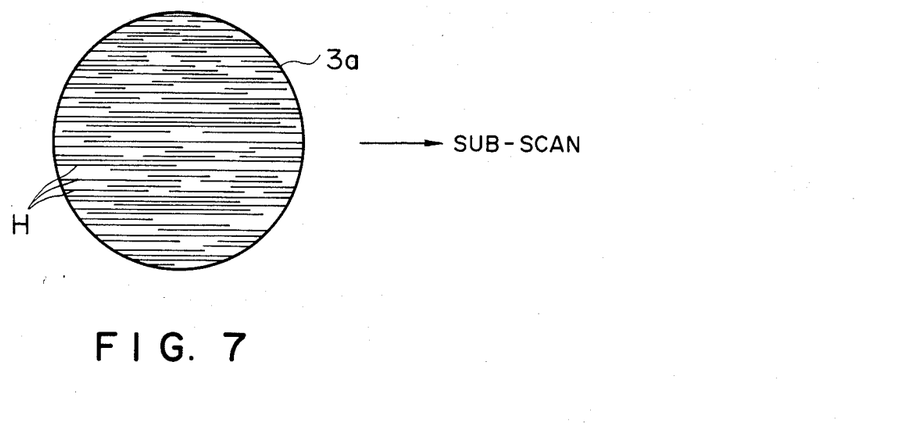
FIG. 7 is an enlarged view of the reflecting surface according to an embodiment of the present invention.

As for the method of forming a cover surface 3a having 60-90% specular reflection rate, a mirror surface of a metal, such as silver, aluminum and chrome, is abraded by a wire brush or sand paper so that a number of hair lines are formed. It is preferable that the hair lines are substantially co-directional. It is further preferable that, as shown in FIG. 7, the hair lines H extend in the direction of the sub-scan, i.e., parallel with the direction of the movement of lamp 4. This is because, if they extend perpendicularly, the amount of the scatteredly reflected light reaching the image pick-up sensor 9 by way of the aforesaid optical elements increases with the result that the sensor erroneously tends to deem the original absent area as an original existing area.

Figure 8:
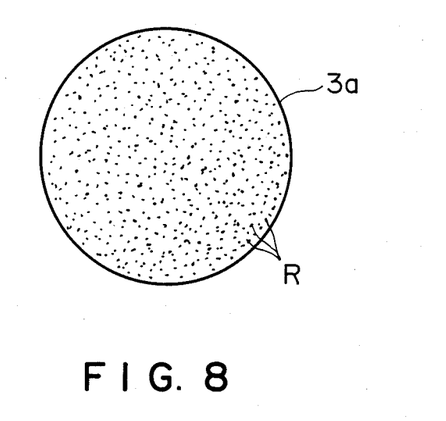
FIG. 8 is an enlarged view of the reflecting surface according to another embodiment of the present invention.

FIG. 8 shows another example of the semi-specular surface, which is unsmooth or roughened. This can be made by forming a number of fine irregularities R (recesses or projections) on a specular surface of a metal such as silver, aluminum and chrome by, for example, sand-blasting and stamping.

Figure 9:
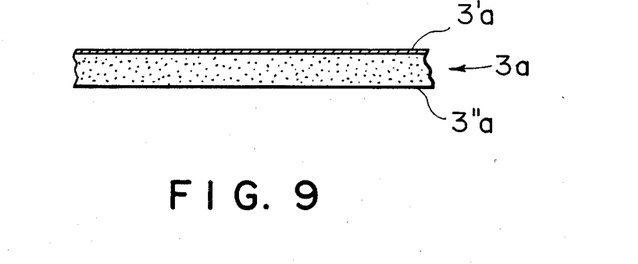
FIG. 9 is a cross-sectional view of the original cover according to an embodiment of the present invention.

Further, as shown in FIG. 9, it is another alternative to provide a sheet 3"a of polyester which is made to scatter and transmit light by, for example, dispersing fine particles therein to give light scattering property, and then forming an evaporated metal layer 3'a of silver, aluminum, chrome or the like on one side thereof. In this example, the other side of the polyester sheet 3" is contacted to the original. The light, having transmitted through the original, further transmit through the polyester layer and then is reflected by the metal evaporated layer 3"a. The reflected light is transmitted back through the polyester layer 3, during which a part of the light is scattered.

Next, a signal processing system for determining the coordinate position of the four corners of the original to determine the position and/or the size of the original. By this system, the positions $(X_1, Y_1)$, $(X_2, Y_2)$, $(X_3, Y_3)$ and $(X_4, Y_4)$ for the corners $P_1$, $P_2$, $P_3$ and $P_4$ are detected, and then the position and/or the size of the original is determined.

Figure 10:
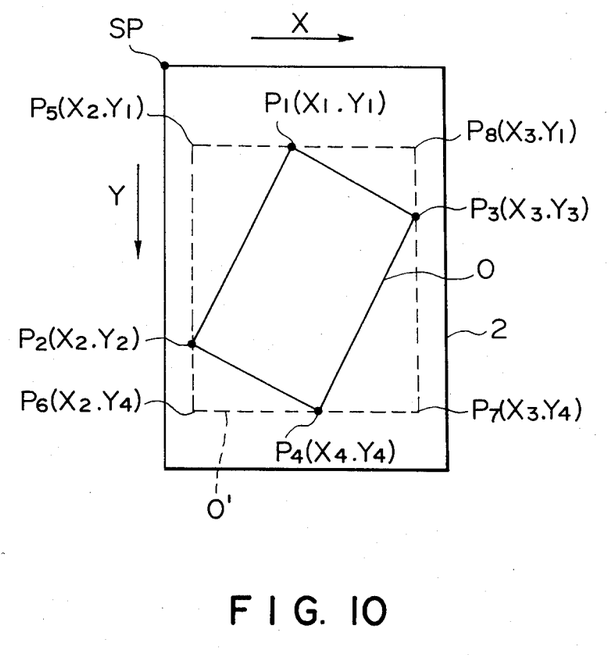
FIG. 10 is a schematic illustration of the original arbitrarily placed on the original support.

As shown in FIG. 10, a point SP on the original supporting glass plate 2 is selected as the origin of the coordinates, wherein X axis is parallel to the main scanning direction and Y axis is parallel to the sub-scanning direction. During a scan, the image pick-up sensor 9 produces black level signals where there is no original. But, when it detects the original edge, it produces a white level signal. The signals are converted to a binary signals each representing black or white level by a binary circuit.

Figures 11, 11B:
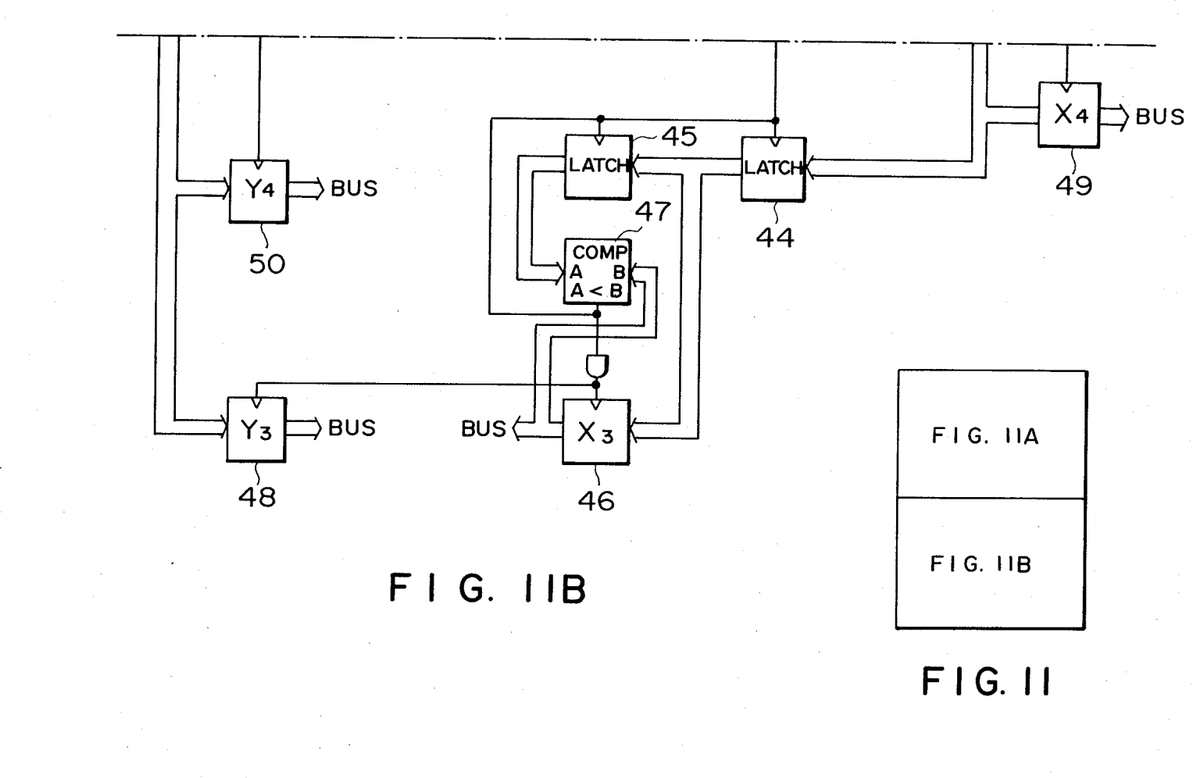
FIGS. 11A and 11B are a block diagram of the system for producing coordinate information signals to determine the location and size of the original.
Figure 11A:
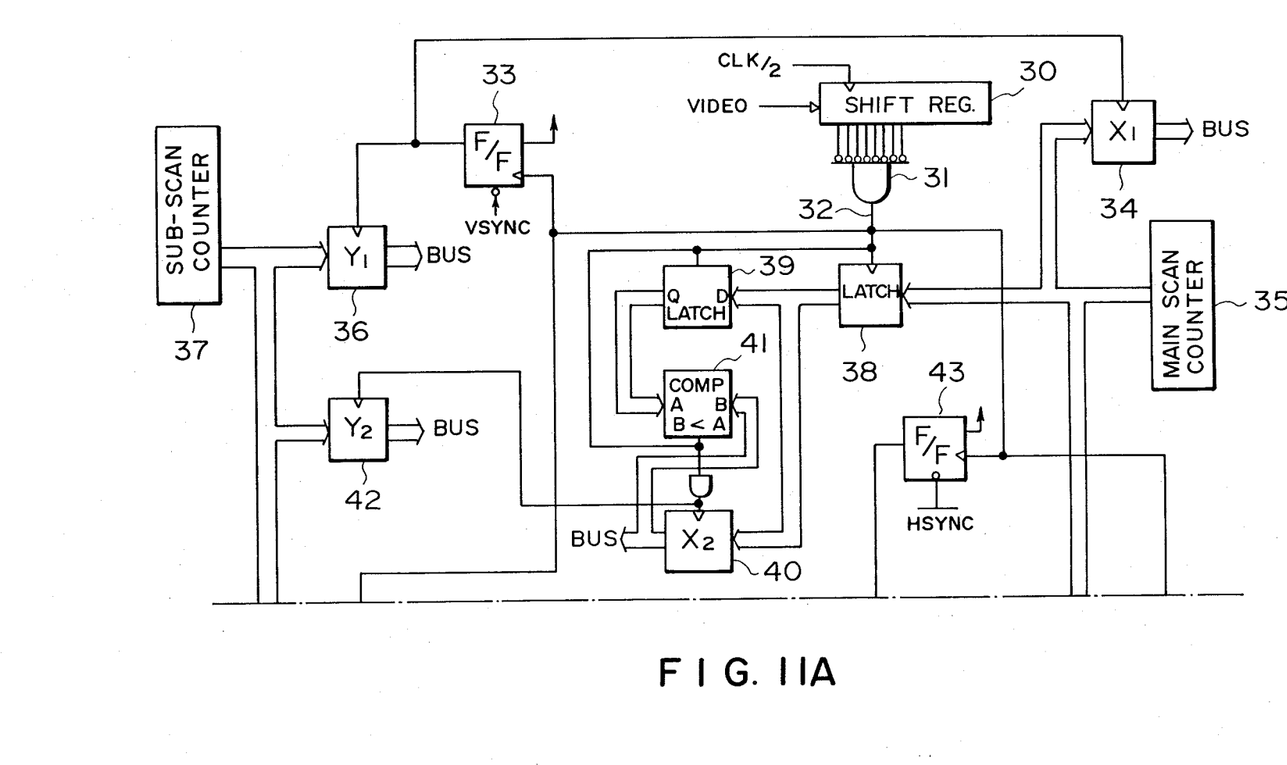

During the pre-scanning operation mentioned hereinbefore, the binary signal (VIDEO) from the image pick-up element 9 is introduced into a shift register 30 in 8 bit unit. After termination of the 8 bit input thereto, the gate circuit 31 discriminates whether or not all the signals are at white level. If so, it outputs 1 to the signal line 32.

The first detection of all (8 bits) white level after the start of scan sets a flip-flop circuit 33, which has previously been reset by an image edge signal VSYNC. The flip-flop circuit 33 is kept set until the next VSYNC is given. When the flip-flop circuit 33 is set, a count of the main scan counter 35 at that time is loaded into a latch 34. This represents the X-axis position $X_1$ of the point $P_1$. Simultaneously, a count of a sub-scan counter 37 is loaded into the latch 36. This is the Y axis position $Y_1$ of the point $P_1$. Thus, the coordinate position $(X_1, Y_1)$ is determined as to the point $P_1$.

Each time the output 1 is given to the signal line 32, the count of the main scan counter 35 is loaded into the latch 38, and the counter is immediately (i.e., before the next 8 bit data enters the shift register 30) stored in the latch 39. When the count of the main scan counter 35 is loaded into the latch 39 upon the first detection of the all (8 bits) white level, it is compared with the data in the latch 40 (which is rendered zero by VSYNC) by a comparator 41. If the data of the latch 39 is greater, the comparator 41 produces a signal to load the data of the latch 38 (which is equal to the data of the latch 39) into the latch 40. At this time, the count of the sub-scan counter 37 is loaded into the latch 42. This is completed before the next 8 bit signal is introduced into a shift register 30. By effecting this comparison between the latch 39 and the latch 40 over the entire image area, the latch 40 finally has a maximum value in the X-axis direction, and the latch 42 finally has a Y-axis position at this time. Thus, the position $(X_2, Y_2)$ is determined for the point $P_2$.

A flip-flop circuit 43 is set upon the first detection of the all white level for each of the main scans. It is reset by a horizontal synchronization signal HSYNC. It is set by the first white level and kept as it is until the next HSYNC is given. At the time when the flip-flop circuit 43 is set, the count of the main-scan counter 35 is set into the latch 44 and loaded into the latch 45 before the next HSYNC. It is compared with the data of the latch 46 by a comparator 47. The latch 46 is preset to the maximum in the X-axis direction at the time of VSYNC production. If the data of the latch 46 is greater than that of the latch 45, the comparator 47 produces a signal to load the data of the latch 44, which is equal to the data of the latch 45 into the latch 46. This operation is performed between a HSYNC signal and the next HSYNC signal. When this comparison is effected over the entire image area, the latch 46 finally has a minimum in the X-axis direction. This is the X-axis position $X_3$ of the point $P_3$. Simultaneously, the count of the sub-scan counter 37 is loaded into the latch 48 is response to the output signal from the comparator 47. This is the position $Y_3$, along the Y-axis, of the point $P_3$. Thus, the position $(X_3, Y_3)$ is determined for the point $P_3$.

To latches 49 and 50, the count of the main scan counter 35 and the count of the sub-scan counter 37 are loaded for each time of the detection of all white level. This is effected over the entire image area. Therefore, at the termination of the pre-scanning operation, the latches 49 and 50 have the counts upon the latest detection of all white level. By this, the position $(X_4, Y_4)$ is determined for the point $P_4$.

The data lines of the latches 34, 36, 40, 42, 46, 48, 49 and 50 are connected to a bus line of an unshown micro-computer. The micro-computer fetches the data of each of them at the termination of the pre-scan. Then, a micro-computer selects the minimum $(X_2)$ and the maximum $(X_3)$ of $X_1, X_2, X_3$ and $X_4$, the minimum $(Y_1)$ and the maximum $(Y_4)$ of $Y_1, Y_2, Y_3$ and $Y_4$, and combine those data $X_2, X_3, Y_1$ and $Y_4$ to determine a square area defined by four points of $P_5(X_2, Y_1)$, $P_6(X_2, Y_4)$, $P_7(X_3, Y_4)$ and $P_8(X_3, Y_1)$. The micro-computer deems the area O' defined by the four points as the original area. During the scanning operation of the original subsequent to the pre-scanning operation, the image information within the area O' is read by the reading station. The lamp and the mirrors are moved through the distance corresponding to the original area O'. The recording material corresponding to the area O' is automatically selected.

In FIG. 10, the original is obliquely placed on the original supporting glass 2. Therefore, the original area O' has been deemed as an area larger than the actual original. However, when the original is placed in order, that is, it is so placed that two ends thereof are parallel to X-axis and the remaining two ends are parallel to Y-axis, the actual original area is read, and the size of the recording material exactly corresponds to this area.

In the case where, the original covering surface 3a is supported on a elastic material such as a sponge to make the covering surface follow the shape of the original, it can deform to a large extent when the original is thick (book original or the like), although there is no problem when the original is thin.

Figure 12A:
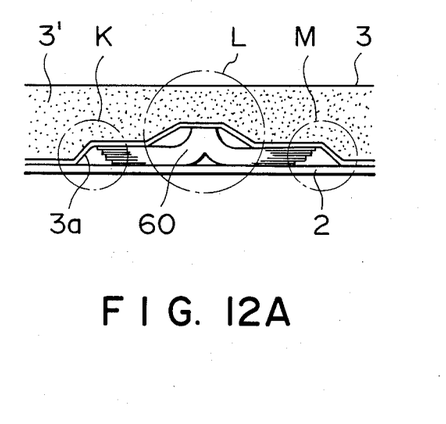
FIG. 12A is an illustration of the original cover deformed by an original.
Figure 12B:
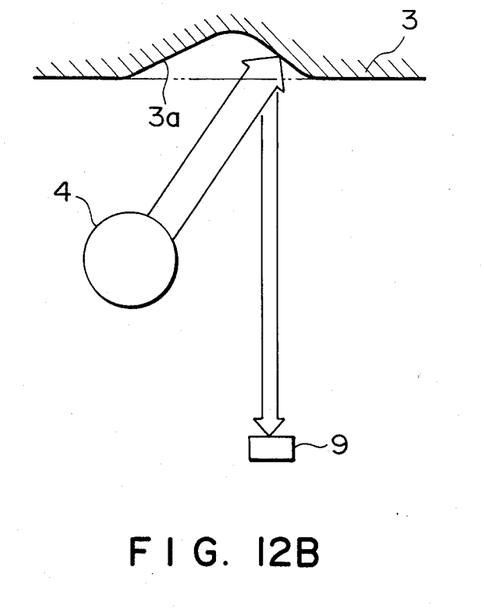
FIG. 12B is an illustration of the light reflection in the state shown in FIG. 12B.

FIG. 12A illustrates such a situation, wherein a three dimentional original 60, i.e., a book is covered by the covering surface 3a of which the back side is lined with a thick sponge layer. As shown by reference characters K, L and M, the covering surface 3a is locally deformed. FIG. 12B shows the deformed surface only for the sake of simplicity. As will be understood from FIG. 12B, a large amount of the light from the lamp 4 is specularly reflected toward the image pick-up element 9, which then can detect the original absent area as an original existing area, because it can not correctly distinguish the original area from the non-original area. Correct detection of the size or the location is not possible. Thus, the deformation of the covering surface 3a can result in an erroneous detection.

Figure 13:
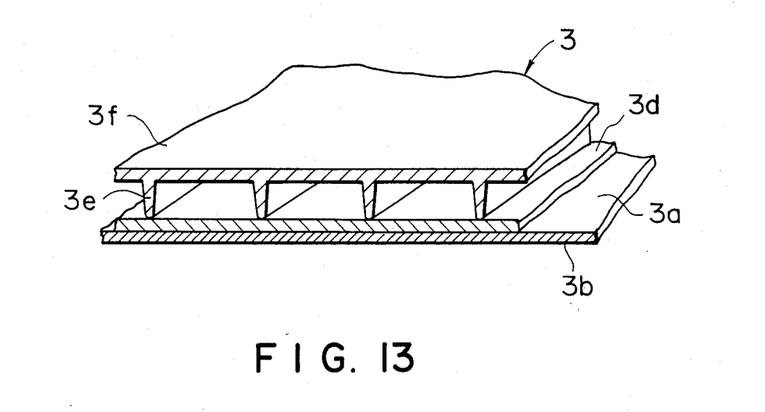
FIG. 13 is a perspective view of the original cover according to an embodiment of the present invention.

FIG. 13 shows an embodiment wherein the covering surface 3a is reinforced so that the possibility of the erroneous detection is eliminated by substantially preventing the deformation. The reflecting surface 3a is formed by evaporating silver, chrome or aluminum onto a one side of a transparent polyester film 3b. To the reflecting surface 3a, a hard plate 3d of a hard plastic material is bonded. Further, the plate 3d is supported by a cover 3f of a hard plastic material having reinforcing legs 3e. By doing so, the reflecting surface 3a is not locally deformed because of the rigidity of the cover 3f and the plate 3d. It is a possible alternative that a metal is evaporated to the plate 3d, or that the plate 3d is made of a metal. In those cases, the layer 3b is not inevitable.

Figure 14:
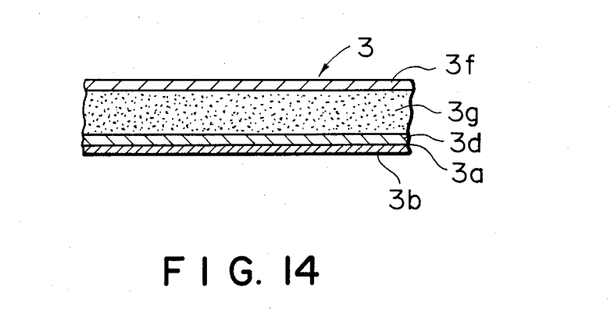
FIG. 14 is a cross-sectional view of the original cover according to another embodiment of the present invention.

FIG. 14 shows another embodiment, wherein the original cover 3 includes a covering 3f of a resin, an elastic member 3g, such as sponge, a hard plate 3d of a plastic material which is not easily deformed and a transparent polyester film 3b having a reflecting metal surface at one side thereof, which are overlaid in the order named. Since a hard plate 3d is sandwiched by the reflecting surface 3a and the resilient member 3g, the surface 3a is not deformed and can softly press the original when a three-dimensional original is placed. It is a possible alternative that a metal is evaporated to the plate 3d, or that the plate 3d is made of a metal. In those cases, the layer 3b is not inevitable.

Figure 15:
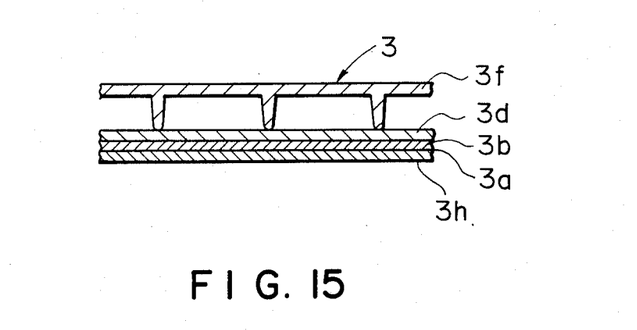
FIG. 15 is a cross-sectional view of the original cover according to a further embodiment of the present invention.

FIG. 15 shows a further embodiment wherein the layer 3b of FIG. 13 is supported by a resin sheet 3h which is of transparent and flexible synthetic resin. Because of this, the possible shock or uncomfortable noise is weakened even when the original cover 3 is closed relatively strongly. In FIG. 15, the reflecting surface 3a is shown as being formed between the sheet 3b and the sheet 3h, but it can be between the sheet 3b and the sheet 3d.

Figure 16:
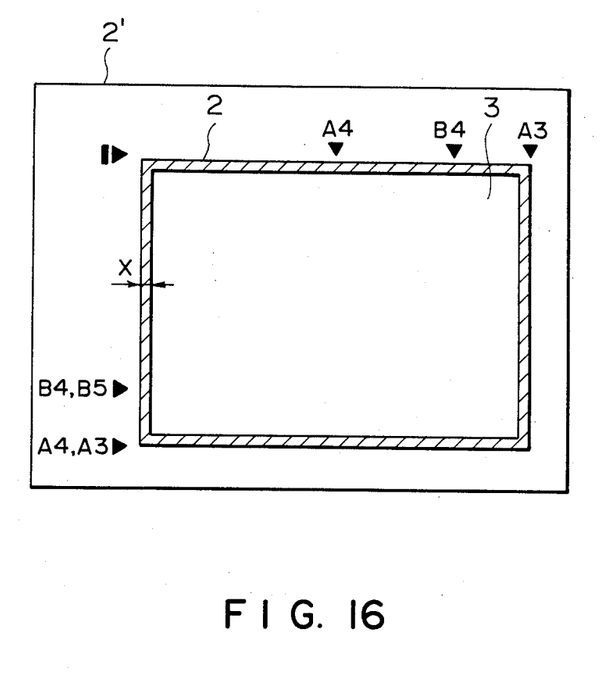
FIG. 16 is an illustration of the size of an original cover.

FIG. 16 shows an embodiment wherein the original cover 3 is smaller than the original supporting area of the original supporting glass 2. With this, when a thin original is placed, the marginal area of the cover surface 3a does not contact a projection for original positioning or a plate for size indices, so that there is not clearance formed between the original and the cover. This enables the original cover 3 to satisfactorily press the original.

While the invention has been described with reference to the structures disclosed herein, it is not confined to the details set forth and this application is intended to cover such modifications or changes as may come within the purposes of the improvements or the scope of the following claims.

What is claimed is:

1. An original image processing apparatus, comprising:
    a member having a surface for supporting an original;
    covering means for covering a back side of the original supported on the surface of said supporting member, said covering means having a light reflecting portion, opposed to the supporting surface, which has a rate of specular reflection not less than 60% and not more than 90%;
    means for illuminating the original supported on the supporting surface;
    photodetector means responsive to an amount of light received by itself to produce an electric signal and located to receive light scatteredly reflected by the original but substantially not to receive light specularly reflected by the light reflecting portion; and
    means for processing the electric signal produced by said photodetector means.

2. An apparatus according to claim 1, wherein said covering means is movable, for placing on and removing from the supporting surface, between an open position wherein it is away from the original and a close position wherein it urges the original onto the supporting surface, wherein said illuminating means is movable relative to the original, and wherein the light reflecting portion includes a metal surface having a number of hair lines extending in the direction corresponding to the direction of movement of said illuminating means.

3. An apparatus according to claim 1, wherein said covering means is movable, for placing on and removing from the supporting surface, between an open position wherein it is away from the original and a close position wherein it urges the original onto the supporting surface, and wherein the light reflecting portion includes an unsmooth metal surface.

4. An apparatus according to claim 1, wherein said covering means is movable, for placing on and removing from the supporting surface, between an open position wherein it is away from the original and a close position wherein it urges the original onto the supporting surface, and wherein the light reflecting portion includes a metal layer and a light reflecting transparent layer on the surface of the metal layer opposed to the supporting surface.

5. An apparatus according to claim 1, 2, 3 or 4, wherein said processing means produces an electric signal for determining a position of the original supported on said supporting means.

6. An apparatus according to claim 1, 2, 3 or 4, wherein said processing means produces an electric signal for determining a size of the original supported on said supporting means.

7. An apparatus according to claim 1, 2, 3 or 4, wherein said processing means produces electric signals corresponding to coordinate positions of the four corners of the original.

8. An original image processing apparatus, comprising:
    a member having a surface for supporting an original;
    means for illuminating the original supported on said supporting surface, said illuminating means being movable relative to the original;
    covering means for covering a back side of the original supported on said surface of said supporting member, wherein said covering means is movable, for placing on and removing from said supporting surface, between an open position wherein it is away from the original and a close position wherein it urges the original onto said supporting surface, said covering means including a light reflecting metal surface opposed to said supporting surface and a member for supporting said metal surface against a deformation thereof when it urges the original placed on said supporting surface, said metal surface having a number of hair lines extending in the direction corresponding to the direction of movement of said illuminating means;
    photodetector means responsive to an amount of light received by itself to produce an electric signal and located to receive light scatteredly reflected by the original but substantially not to receive light specularly reflected by said light reflecting portion; and
    means for processing the electric signal produced by said photodetector means.

9. An original image processing apparatus, comprising:
    a member having a surface for supporting an original;
    covering means for covering a back side of the original supported on said surface of said supporting member, wherein said covering means is movable, for placing on and removing from said supporting surface, between an open position wherein it is away from the original and a close position wherein it urges the original onto said supporting surface, said covering means including a light reflecting metal surface opposed to said supporting surface and a member for supporting said metal surface a deformation thereof when it urges the original placed on said supporting surface, said metal surface being an unsmooth surface such as to have a rate of specular reflection no less than 60% and not more than 90%;

means for illuminating the original supported on said supporting surface;

photodetector means responsive to an amount of light received by itself to produce an electric signal and located to receive light scatteredly reflected by the original but substantially not to receive light specularly reflected by said light reflecting portion; and means for processing the electric signal produced by said photodetector means.

10. An original image processing apparatus, comprising:

a member having a surface for supporting an original;

covering means for covering a back side of the original supported on said surface of said supporting member, wherein said covering means is movable, for placing on and removing from said supporting surface, between an open position wherein it is away from the original and a close position wherein it urges the original onto said supporting surface, said covering means including a light reflecting metal surface opposed to said supporting surface, a transparent layer covering said metal surface and a member for supporting said metal surface against a deformation thereof when said covering means urges the original placed on said supporting surface;

means for illuminating the original supported on said supporting surface;

photodetector means responsive to an amount of light received by itself to produce an electric signal and located to receive light scatteredly reflected by the original but substantially not to receive light specularly reflected by said light reflecting portion; and means for processing the electric signal produced by said photodetector means.

11. An apparatus according to claim 10, wherein said metal surface has a rate of specular reflection not less than 60% and not more than 90%.

12. An apparatus according to claim 8, 9 or 11, wherein said processing means produces an electric signal for determining a position of the original supported on said supporting means.

13. An apparatus according to claim 8, 9 or 11, wherein said processing means produces an electric signal for determining a size of the original supported on said supporting means.

14. An apparatus according to claim 8, 9 or 11, wherein said processing means produces electric signals corresponding to coordinate positions of the four corners of the original.

* * * * *

UNITED STATES PATENT AND TRADEMARK OFFICE
CERTIFICATE OF CORRECTION

PATENT NO. : 4,623,938

DATED : November 18, 1986

INVENTOR(S) : JUNICHI ASANO, ET AL.

It is certified that error appears in the above-identified patent and that said Letters Patent is hereby corrected as shown below:

Column 1, line 8, "or facsimile machine, original" should read --facsimile machine, or original--.

Column 1, line 35, "a" should read --an--.

Column 2, line 16, "district" should read --distinct--.

Column 6, line 11, "succinct" should read --distinct--.

Column 6, line 49, "transmit" should read --transmits--.

Column 6, lines 50-1, "metal evapo-/rated layer 3"a." should read --evaporated metal layer 3'a.--.

Column 6, line 56, "original." should read --original will be described.--.

Column 6, line 68, "a binary" should read --binary--.

Column 8, line 10, "combine" should read --combines--.

Column 8, line 30, "where, the" should read --where the--.

Column 8, line 31, "a elastic" should read --an elastic--.

UNITED STATES PATENT AND TRADEMARK OFFICE
CERTIFICATE OF CORRECTION

PATENT NO. : 4,623,938

DATED : November 18, 1986

INVENTOR(S) : JUNICHI ASANO, ET AL.

It is certified that error appears in the above-identified patent and that said Letters Patent is hereby corrected as shown below:

Column 8, line 37, "dimentional" should read --dimensional--.

Column 10, line 64, "surface a" should read --surface against a--.

Signed and Sealed this

Third Day of March, 1987

Attest:

DONALD J. QUIGG

Attesting Officer

Commissioner of Patents and Trademarks